United States Patent [19]

Sparks

[11] Patent Number: 5,738,433
[45] Date of Patent: Apr. 14, 1998

[54] LIGHTED FISHING POLE

[76] Inventor: Kevin D. Sparks, 1468 E. Zinnia Dr., Bloomington, Ind. 47401

[21] Appl. No.: 712,853

[22] Filed: Sep. 12, 1996

Related U.S. Application Data

[60] Provisional application No. 60/003,704 Sep. 13, 1995.

[51] Int. Cl.$^6$ .............................. A01K 75/02; F21V 33/00
[52] U.S. Cl. .............................. 362/109; 362/802; 43/17.5
[58] Field of Search .............................. 362/102, 109, 362/103, 191, 800, 802; 43/17.5, 18.1

[56] References Cited

U.S. PATENT DOCUMENTS

| | | | |
|---|---|---|---|
| 1,752,397 | 4/1930 | See | 362/191 |
| 4,026,059 | 5/1977 | Ochs | 43/17.5 |
| 4,085,437 | 4/1978 | Hrdlicka et al. | 362/109 |
| 4,117,618 | 10/1978 | Utsler | 43/17.5 |
| 4,479,321 | 10/1984 | Welstead | 43/17 |
| 4,775,920 | 10/1988 | Seibert | 362/109 |
| 5,056,821 | 10/1991 | Fierro | 362/102 |
| 5,172,508 | 12/1992 | Schmidt et al. | 43/17.5 |
| 5,182,873 | 2/1993 | Aragon, Jr. | 43/17.5 |
| 5,276,990 | 1/1994 | Ramirez | 43/17.5 |
| 5,357,410 | 10/1994 | Cota et al. | 362/109 |
| 5,586,403 | 12/1996 | Ward | 43/17.5 |

FOREIGN PATENT DOCUMENTS

| | | |
|---|---|---|
| 604050 | 4/1960 | Italy . |
| 2052231 | 1/1981 | United Kingdom . |

*Primary Examiner*—James C. Yeung
*Attorney, Agent, or Firm*—Baker & Daniels

[57] ABSTRACT

A fishing pole which is automatically illuminated when a fish strikes the fishing line. The fishing pole includes a handle in which is provided a light bulb and a power source. The rod projecting from the handle either includes a hollow core or is provided with fiber optics which internally pass or externally wrap along the length of the rod. When a sensor mounted at the tip of the rod senses a fish strike on the fishing line, the light bulb is caused to light up and project light into the hollow core or fiber optics to cause the rod to be illuminated along its length. The fishing pole also includes a second light bulb integrated into the bottom portion of the handle which can be switched on by a fisherperson to function as a flashlight.

2 Claims, 3 Drawing Sheets

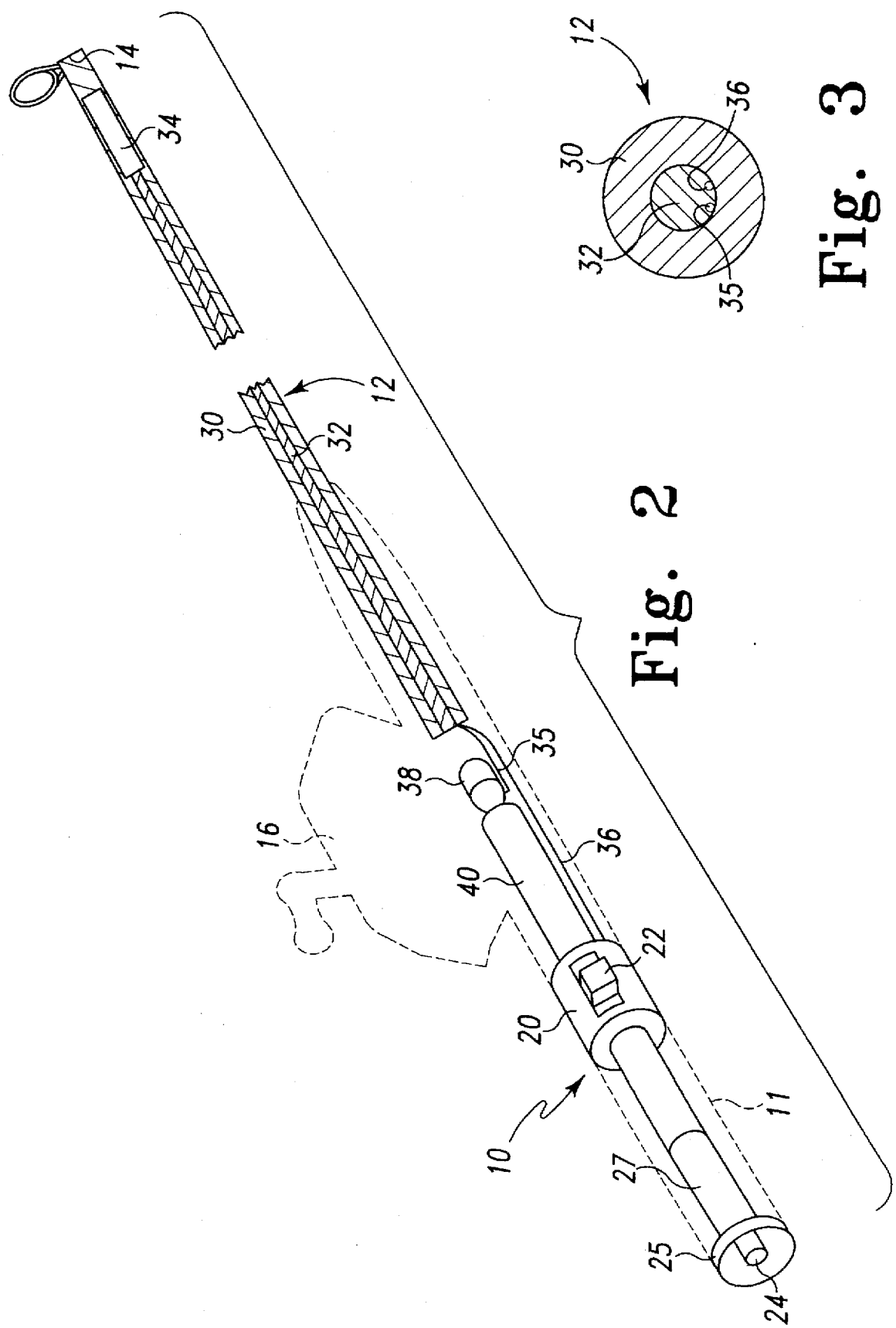

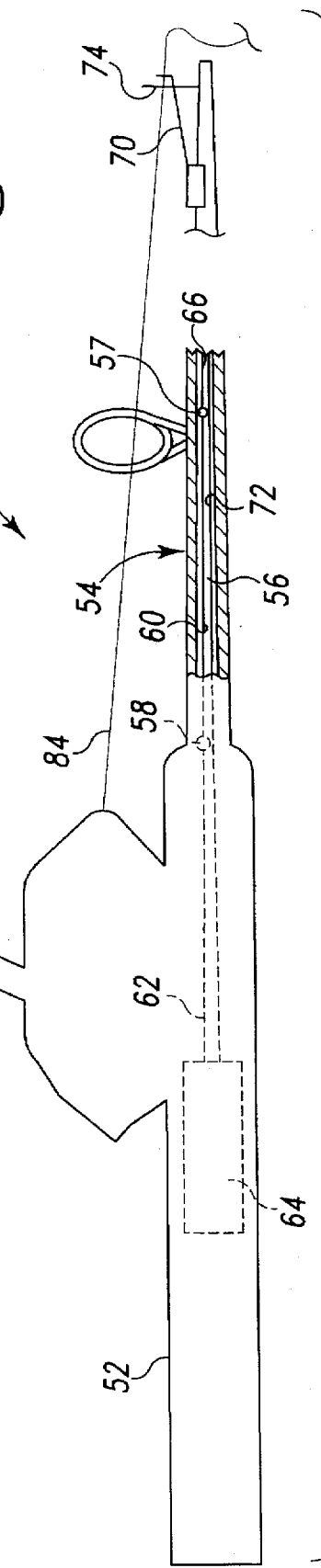
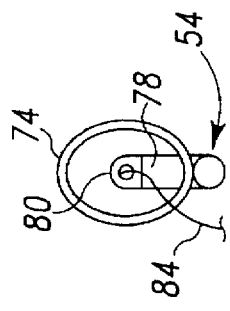
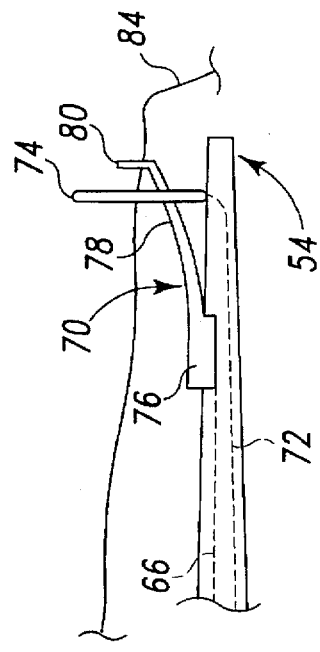
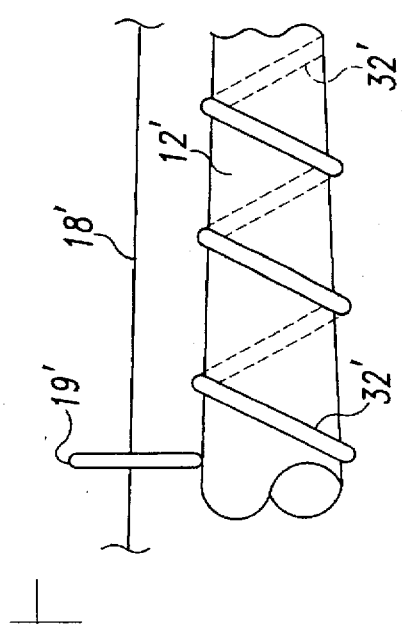

LIGHTED FISHING POLE

CROSS REFERENCE TO RELATED APPLICATION

This application claims the benefit under 35 U.S.C. §119 (e) of U.S. Provisional application Ser. No. 60/003,704, filed Sep. 13, 1995.

BACKGROUND OF THE INVENTION

The present invention pertains to a fishing pole intended for night fishing, and in particular to a fishing pole which is illuminated when a fish strikes the bait.

Many people who fish enjoy night-time fishing. One problem with fishing during the night is that it is often difficult for a person to see when a fish is nibbling or striking at the bait. Specifically, because of the darkness, the bobbing or bending of the fishing pole that occurs when a fish is taking the bait may not be readily visible to a fisherperson. One known night fishing light disclosed in U.S. Pat. No. 4,479,321 is intended to light up when a fish strikes. However, a shortcoming of this design is that pole arcing upon a fish strike may be difficult to discern as only an exposed bulb mounted near the end of the fishing pole illuminates.

Another problem with night fishing is that reaching a fishing hole or other fishing destination typically requires a person to walk at least some distance in the dark. To avoid missteps and unexpected encounters with objects in the darkness, a fisherperson frequently carries a flashlight or lamp to illuminate the way. While functional, the need for a separate lamp complicates the fishing expedition. For one thing, the need to hold the lamp may interfere with the fisherperson's ability to conveniently carry the remainder of the fishing gear. Still further, unless careful, the fisherperson may have difficultly later finding the lamp after it is turned off and set down at the fishing hole. To provide a light source, one fishing pole disclosed in U.S. Pat. No. 4,085,437 employs a flashlight type mechanism in its handle. Another pole design disclosed in U.S. Pat. No. 4,026,059 employs a lamp in the pole handle to illuminate the rod and the fishing line. While capable of being lit, these fishing poles light up at a person's election and do not aid a fisherperson by turning on automatically when a fish strike occurs.

Thus, it is desired to provide a lighted fishing pole which overcomes these and other problems of the prior art.

SUMMARY OF THE INVENTION

The present invention aids night fishing by providing a fishing pole in which the rod is illuminated along its entire length when a fish strikes the bait, thereby providing a highly visible indication to a user of a strike. The inventive fishing pole also includes a separate light source integrated into its handle to allow the fishing pole to be used as a flashlight to aid a fisherperson in reaching a fishing site and performing tasks thereat such as baiting hooks.

In one form thereof, the present invention provides a lighted fishing pole including an elongated rod, a handle at a first end of the elongated rod, a reel including fishing line threaded through line guides of the rod, means for illuminating the elongated rod along a portion of the entire length of the elongated rod, and means for controlling the illuminating means. The controlling means includes means for sensing a strike on the fishing line, and the controlling means activates a previously inactive illuminating means upon the sensing means sensing the strike to thereby produce an illumination of the elongated rod.

In another form thereof, the present invention provides a lighted fishing pole including an elongated rod with a fiber optic or hollow core extending along at least substantially the entire length of the elongated rod, a handle attached to a first end of the rod, and a fishing reel mounted to the handle, wherein the fishing reel includes fishing line strung along the length of the rod. The fishing pole also includes a power source mounted internally within the handle, a light emitting element mounted to one of the handle and the elongated rod, wherein the light emitting element is structured and arranged to introduce light into the fiber optic or hollow core upon energization of the light emitting element to thereby illuminate at least substantially the entire length of the elongated rod, and a sensor for identifying a fish strike-level force input on the fishing line. The sensor is circuited with the light emitting element and the power source to cause energization of the light emitting element by the power source upon sensing the fish strike-level force input on the fishing line and to prevent energization of the light emitting element by the power source absent sensing of the fish strike-level force input on the fishing line.

In still another form thereof, the present invention provides a lighted fishing pole including an elongated rod, a handle attached to a first end of the rod, a fishing reel mounted to the handle, wherein the fishing reel includes fishing line strung along the length of the rod, a power source mounted internally within the handle, a first light emitting element mounted on the handle, and a second light emitting element mounted on one of the handle and the elongated rod, wherein the second light emitting element is structured and arranged to illuminate at least a portion of the entire length of the elongated rod upon energization. The fishing pole also includes a sensor for identifying a fish strike-level force input on the fishing line, wherein the sensor is electrically circuited with the second light emitting element to allow energization of the second light emitting element upon sensing the fish strike-level force input on the fishing line and to prevent energization of the second light emitting element absent sensing of the fish strike-level force input on the fishing line. The fishing pole includes a manually operable switch connected with the power source and the first and second light emitting elements, wherein the power source is circuited with the first light emitting element to illuminate the first light emitting element when the switch is arranged in a first position, and the power source is circuited with the second light emitting element to illuminate the second light emitting element when the switch is arranged in a second position and the sensor identifies the fish strike-level force input on the fishing line.

One advantage of the lighted fishing pole of the present invention is that a light source is automatically activated when a fish strikes the bait on the fishing line.

Another advantage of the present invention is that the entire rod is illuminated when a fish strikes:, which not only results in a readily noticeable, visible indication of a fish strike, but also allows the fisherperson to easily see the bending of the rod to help gauge the size of the striking fish.

Still another advantage of the present invention is that the fish strike sensing mechanism can be provided in a convenient and cost effective fashion, and in a manner which does not interfere with the normal workings of the fishing pole.

Still another advantage of the present invention is that a flashlight-type light source is incorporated into the handle of the fishing pole to eliminate the need for a fisherperson to carry a separate flashlight.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein:

FIG. 2 is a diagrammatic, fragmentary perspective view in partial longitudinal section of selected portions of the lighted fishing pole of FIG. 1;

FIG. 3 is a transverse cross-sectional view of the rod portion of the fishing pole of FIG. 1 taken along line 3—3;

FIG. 4 is a side view of an alternate embodiment showing a portion of a rod with an external wrapping of a fiber optic;

FIG. 5 is a diagrammatic, fragmentary side view in partial longitudinal section of selected portions of still another alternate embodiment of the present invention;

FIG. 6 is an enlarged side view of the tip portion of the rod of FIG. 5 further illustrating the fish strike sensor; and FIG. 7 is an end view of FIG. 6.

Figure 1:
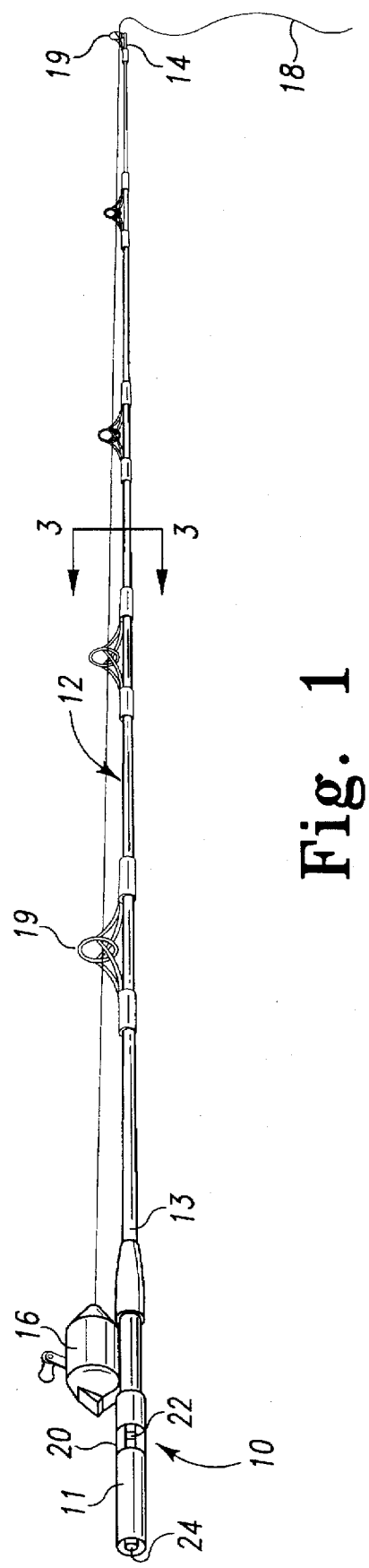
FIG. 1 is a side view of a first embodiment of a lighted fishing pole of the present invention.

Corresponding reference characters indicate corresponding parts throughout the several views. Although the drawings represent embodiments of the invention, the drawings are not necessarily to scale and certain features may be exaggerated or omitted in selected drawings in order to better illustrate and explain the present invention.

DESCRIPTION OF THE PREFERRED EMBODIMENTS

Referring now to FIG. 1, there is shown a first embodiment of a lighted fishing pole constructed according to the present invention. The fishing pole includes a handle, generally designated 10, and a rod or pole 12 that extends from handle 10 and terminates at tip 14. As used herein, the term handle generally refers to that portion of the pole's length which includes the hand grippable portion 11 and that ends at the proximate rod end indicated at 13. Reel 16 is shown mounted on handle 10 in a typical fashion, but may be alternatively mounted within the scope of the invention. Fishing line 18, which may be wound within reel 16 as is conventional, is threaded through circular line guides or eyelets 19 fixedly secured to and spaced along the length of rod 12.

FIG. 2 diagrammatically illustrates selected portions of the fishing pole of FIG. 1 in partial longitudinal sectional view, and partially in dashed lines. Handle 10 is water-tight when assembled and includes a switch mechanism 20 with an externally exposed switch member 22 operable by the pole user. Switch member 22 is shown in a neutral or off position in FIG. 2 and may be moved to the left and right in FIG. 2 to selectively actuate different illuminating aspects of the inventive fishing pole as described further below. The distal or bottom end of handle 10 is capped by a lens covered lamp bulb 24 in an externally threaded socket 25. Socket 25 screws into the body of handle 10 and can be unscrewed for battery replacement. A power source 27, such as a pair of AA batteries shown, provides electrical power for lamp bulb 24. The electrical contact for completing the circuit between switch mechanism 20 and bulb 24 is well known and not shown for purposes of clarity of illustration. When a fisherperson slides switch member 22 toward the handle bottom, the electrical circuit is completed between power source 27 and bulb 24 and bulb 24 lights up. When lit up, bulb 24 casts a beam of light in a direction opposite to the direction from which rod 12 projects from handle 10. This lighting arrangement advantageously provides the fisherperson with a flashlight that is integral with the fishing pole and that may be used during, for example, hook baiting.

Rod 12 of the fishing pole shown in FIGS. 1–3 is made of a translucent fiberglass, but may also be made from other materials having suitable flexibility and strength. Beginning at the rod end held within handle 10 and extending substantially the entire rod length to tip 14, axially encased within the fiberglass material 30 of rod 12 is one or more illuminatable strands of material abstractly shown at 32 in FIGS. 2 and 3. For example, a bundle of fiber optics may be used for 32. Alternatively, provided rod 12 is constructed of a sufficient strong material, a hollow passageway through which light may pass to illuminate the fiberglass 30 may be substituted for fiber optics 32. Still further, if constructed of a sufficiently translucent material, rod 12 can be a solid shaft and the material of the rod may serve as a fiber optic.

In order to achieve an illumination which is highly visible to a user, substantially all of the rod length lights up upon the fish strike. As used herein, substantially all means over half and more particularly over three-quarters of the rod length between ends 13 and 14. In addition, if only a portion of the entire rod length is illuminated, illumination of a length portion near tip 14 provides a better view of rod bending.

Proximate rod tip 14 is a sensor switch 34 for sensing a fish strike. For example, sensor switch 34 may be a pressure sensor for detecting pole bending. Sensor switch 34 is shown embedded within rod 12, but may be mounted externally on rod 12 in alternate embodiments. A pair of wires indicated at 35, 36 are electrically connected at one end to a light source 38, such as a lamp bulb, and switch mechanism 20, respectively. Wires 35, 36 extend through rod 12, such as by being encased with fiber optics 32 within rod 12 as shown in the cross-sectional view of FIG. 3, and are each separately circuited at their opposite ends to sensor switch 34. In an alternate embodiment, electrical wires 35, 36 could be attached externally along the rod periphery. Within handle 10 is a second power source or battery 40 electrically connected to bulb 38 and switch mechanism 20. It is within the scope of the invention for the second power source to be eliminated and to operate all illumination features of the invention with a common power source.

The structure of the fishing pole will be further understood in view of the following explanation of its operation. When switch member 22 is in the off position shown in FIG. 2, neither the flashlight aspect or rod illuminating aspect of the invention is operable. When switch mechanism 20 is operated by sliding switch member 22 down or to the left in FIG. 2, light bulb 24 is energized to serve as a flashlight while the rod illuminating aspect is still non-operational.

When switch mechanism 20 is operated by sliding switch member 22 up or to the right in FIG. 2, the pole illuminating aspect of the invention is operational while the flashlight aspect (bulb 24) remains off. Specifically, when the tip portion of rod 12 is not being bent, pressure sensor switch 34 produces an open electrical circuit between wires 35, 36 such that light bulb 38 is not illuminated by power source 40 and therefore no light is projected into fiber optics 32. When pressure sensor switch 34 senses sufficient pressure, which results from the rod bending or arcing down as the tip of the rod is pulled down by a fish strike-level force input on fishing line 18, the electrical circuit between wires 35, 36 is closed by switch 34 and light bulb 38 is turned on. A fish strike-level force input occurs, for example, when a fish strikes the bait at the cast or outward end of fishing line 18, or when the outward end of fishing line 18 is manually pulled laterally away from the fishing pole with a force equal to or greater than a force exerted by a fish on the line when bait is taken. The light rays or photons created by light bulb 38 are carried along the length of rod 12 by fiber optics 32 and serve to light up rod 12 along its length. The translucent fiberglass allows the lighted fiber optics encased therein to be visible when illuminated.

In situations where the materials of rod construction are opaque such as in a graphite rod, the fiber optics can be wrapped around the exterior surface of the opaque rod along whatever portion of the rod length is desired to be lighted upon a fish strike. For example, as shown in the partial side view of FIG. 4 in which a fishing line 18' and rod eyelet 19' are illustrated, a fiber optic 32' may be spirally wound around rod 12'. Rather than the shown spiral, tighter spirals whereby each successive loop of fiber optic is directly adjacent the prior loop of the fiber optic may also be employed to provide additional brightness for a given fiber optic material. Different wrapping techniques may also be employed such that, for example, the fiber optic longitudinally extends along the rod length. In addition, although illumination along the rod length is generally desirable, in alternate embodiments the fiber optics may be used to illuminate an object at the end of the fibers such as at tip 14, or the fiber optics may be dispensed with and the bulb 38 made visible in handle 10 or somewhere else along the rod length.

FIG. 5 is a diagrammatic and fragmentary side view of another embodiment of the fishing pole of the present invention, wherein parts of the fishing pole are shown in longitudinal section. FIG. 6 is an enlarged side view of the forward tip of the fishing pole of FIG. 5, and FIG. 7 is an end view of FIG. 6. The fishing pole of FIGS. 5–7 is conceptually similar in numerous respects to the fishing pole of FIGS. 1–3, and therefore further description of this alternate embodiment primarily focuses on the differences between the poles.

The fishing pole, generally designated 50, includes a handle 52 from which extends an elongate rod 54 formed of a translucent fiberglass material. Elongate rod 54 includes a hollow core 56 in which is axially fixed a lamp bulb represented at 57. Lamp bulb 57 is positioned along rod 54 forward of handle 52 and electrically connected in series with lamp bulb 58 by conductor wire 60. Although positioned more forward within its respective handle, lamp bulb 58 generally corresponds to lamp bulb 38 of the fishing pole of FIGS. 1–3. Still additional bulbs may be added in series both forward and rearward of lamp bulb 57 along the rod length to create additional points of brightness along the rod, or for use with less translucent rod materials. As indicated at 62, lamp bulb 58 is circuited with an on/off switch and power source abstractly represented at 64.

Opposite ends of a conductor wire 66 are electrically circuited to lamp bulb 57 and a leaf spring 70 as further shown in FIG. 6. The opposite ends of another conductor wire 72 are circuited with a rod eyelet or line guide 74 (See FIG. 6) and switch/power source 64. Although not shown, the hollow core of rod 54 extends the entire rod length such that conductor wires 66 and 72 extend therethrough to locations near the rod tip at which the wires pass through radial bores in the rod to provide for electrical contact with spring 70 and line guide 74, respectively. The various conductor wires also may be external to rod 54 within the scope of the invention.

Referring now to FIG. 6, one end 76 of leaf spring 70 is secured to rod 54. The leaf spring body 78 extends through eyelet 74 and terminates at an upstanding eyelet portion 80 through which fishing line 84 is threaded. Both leaf spring 70 and eyelet 74 are constructed from metal or an electrically conductive material so as to form parts of an electrical circuit or switch between conductor wires 66 and 72. When no forces are being exerted on fishing line 84, leaf spring 70 assumes the unbiased or rest arrangement shown in FIGS. 5–7 in which it is in a non-contacting or spaced apart relationship with eyelet 74. When a fish strikes the baited end of fishing line 84, the force exerted on the fishing line by the fish is transferred to leaf spring 70 such that spring eyelet portion 80 is pulled down toward rod 54. When spring 70 contacts eyelet 74, the electrical circuit is completed and lamp bulbs 57 and 58 light up to illuminate rod 54.

In alternate embodiments, different flexible members may be substituted for leaf spring 70. For example, a coiled spring may be employed which can more readily deflect in different radial directions within eyelet 74 from the perspective of a FIG. 7 viewer to provide for electrical contact with rod eyelet 74 at different points along the eyelet circumference. In addition, leaf spring 70 and eyelet 74 may be made of electrical insulators and separate electrical conductors, connected to wires 66 and 72, may be provided on spring 70 and eyelet 74 or rod 54.

In another embodiment which is not shown, the function of wires 35, 36 in the fishing pole of FIGS. 1–3 can be provided with, amongst other things, an additional fiber optic strand coaxial with the bundle of fiber optics. The pressure sensor switch at the rod tip is circuited with an optical transmitter at the rod tip. The transmitter includes a light-emitting diode (LED), a lens assembly and a power source such as a small battery. The additional fiber optic strand extends between the transmitter and an optical receiver mounted in the fishing pole handle. The receiver includes a photodiode, a lens assembly and amplifier electronics operably connected to the power source. When the pressure sensor switch senses a fish bite by sensing rod bending, the transmitter is provided with electrical information and generates a modulated light that is shot through the additional fiber to the receiver. The receiver turns the light signal from the transmitter back into electrical information which is utilized to turn on light bulb 38 to illuminate the other fibers of the bundle and thereby illuminate the fishing pole.

While this invention has been described and shown as having multiple designs, the present invention may be further modified within the spirit and scope of this disclosure. In particular, different types of sensors to detect fish strikes may be employed. For example, different apparatuses which sense the tension in the fishing line can be substituted for the sensor that senses pole bending or that utilizes movement of the leaf spring. In addition, rather than or in conjunction with using pole illumination to indicate a fish strike, an audio output device could be incorporated into the inventive fishing pole and operatively connected to the fish strike sensor so as to generate an audible indication on occasion of a strike on the fishing line. This application is therefore intended to cover any variations, uses, or adaptations of the invention using its general principles. Further, this application is intended to cover such departures from the present disclosure as come within known or customary practice in the art to which this invention pertains.

What is claimed is:

1. A lighted fishing pole comprising:

an elongated rod having a length and first and second ends;

a handle attached to said first end of said elongated rod;

a fishing reel mounted to said handle, said fishing reel including fishing line strung along the length of said elongated rod;

a power source mounted internally within said handle;

a first light emitting element mounted on said handle and adapted to illuminate in a first direction which is opposite to a second direction in which said elongated rod projects from said handle;

a second light emitting element mounted on one of said handle and said elongated rod, said second light emitting element structured and arranged to illuminate substantially the entire length of said elongated rod upon energization;

a sensor for identifying a fish strike-level force input on said fishing line, said sensor electrically circuited with said second light emitting element to allow energization of said second light emitting element upon sensing the fish strike-level force input on said fishing line and to prevent energization of said second light emitting element absent sensing of the fish strike-level force input on said fishing line;

a manually operable switch connected with said power source and both of said first and second light emitting elements, said switch shiftable to a first position and a second position;

wherein said power source is circuited with said first light emitting element to illuminate said first light emitting element when said switch is arranged in said first position; and wherein said power source is circuited with said second light emitting element to illuminate said second light emitting element when said switch is arranged in said second position and said sensor identifies the fish strike-level force input on said fishing line, whereby substantially the entire length of said elongated rod is illuminated.

2. The lighted fishing pole of claim 1 further comprising at least one fiber optic internally extending along substantially the entire length of said elongated rod and through which light from said second light emitting element passes to illuminate substantially the entire length of said elongated rod.

* * * * *